(12) United States Patent
Saints et al.

(10) Patent No.: US 8,085,840 B2
(45) Date of Patent: Dec. 27, 2011

(54) METHOD AND APPARATUS FOR REDUCING INTERFERENCE OF A SIGNAL OVER A PLURALITY OF STAGES

(75) Inventors: Keith W. Saints, San Diego, CA (US); Peter Gaal, San Diego, CA (US); Gilbert Leung, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 621 days.

(21) Appl. No.: 12/243,877

(22) Filed: Oct. 1, 2008

(65) Prior Publication Data

US 2010/0080279 A1    Apr. 1, 2010

(51) Int. Cl.
*H03H 7/30* (2006.01)
*H03D 1/06* (2006.01)
(52) U.S. Cl. ........................... 375/232; 375/348
(58) Field of Classification Search .......... 375/348, 375/232, 346, 316, 230, 229
See application file for complete search history.

(56) References Cited

U.S. PATENT DOCUMENTS

| 7,203,257 | B2 | 4/2007 | Fimoff et al. |
| 7,650,443 | B1* | 1/2010 | Cavanagh et al. ........... 710/52 |
| 2005/0078742 | A1* | 4/2005 | Cairns et al. ............... 375/148 |
| 2006/0109897 | A1* | 5/2006 | Guo et al. ................... 375/232 |
| 2006/0215748 | A1* | 9/2006 | Xia et al. .................... 375/233 |
| 2007/0140321 | A1* | 6/2007 | Yousef et al. ............... 375/148 |
| 2007/0171960 | A1 | 7/2007 | Zhang et al. |

FOREIGN PATENT DOCUMENTS

| EP | 0448758 A1 | 10/1991 |
| EP | 1816814 A2 | 8/2007 |
| WO | WO2008074923 | 6/2008 |

OTHER PUBLICATIONS

International Search Report and the Written Opinion—PCT/US2009/058269, International Search Authority—European Patent Office—Apr. 8, 2010.

* cited by examiner

*Primary Examiner* — David C. Payne
*Assistant Examiner* — Brian J Stevens
(74) *Attorney, Agent, or Firm* — Alan C. Gordon; Sayed H. Beladi (57) ABSTRACT

An apparatus for reducing interference of a signal over a plurality of stages includes a processor configured to determine at least two equalizer taps based on at least one of a covariance and a channel impulse response of the signal. The processor is further configured to estimate at least one additional equalizer tap based on the at least two equalizer taps. In addition, the processor is configured to reduce, for each of the plurality of stages, the interference of the signal for that stage using an equalizer tap from either the at least two equalizer taps or the at least one additional equalizer tap, so that the signal for the next stage in the plurality of stages has the reduced interference. A method is also provided for reducing interference of a signal over a plurality of stages.

27 Claims, 8 Drawing Sheets

METHOD AND APPARATUS FOR REDUCING INTERFERENCE OF A SIGNAL OVER A PLURALITY OF STAGES

BACKGROUND

1. Field

The present invention relates to electronic devices and communications, and more particularly, to a method and apparatus for reducing interference of a signal over a plurality of stages.

2. Background

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, reducing interference in a wireless communication system is desired.

SUMMARY

In one aspect of the disclosure, an apparatus for reducing interference of a signal over a plurality of stages is provided. The apparatus includes a processor configured to determine at least two equalizer taps based on at least one of a covariance and a channel impulse response of the signal. The processor is further configured to estimate at least one additional equalizer tap based on the at least two equalizer taps. In addition, the processor is configured to reduce, for each of the plurality of stages, the interference of the signal for that stage using an equalizer tap from either the at least two equalizer taps or the at least one additional equalizer tap, so that the signal for the next stage in the plurality of stages has the reduced interference.

In a further aspect of the disclosure, a method for reducing interference of a signal over a plurality of stages is provided. The method includes determining at least two equalizer taps based on at least one of a covariance and a channel impulse response of the signal, and estimating at least one additional equalizer tap based on the at least two equalizer taps. The method further includes reducing, for each of the plurality of stages, the interference of the signal for that stage using an equalizer tap from either the at least two equalizer taps or the at least one additional equalizer tap, so that the signal for the next stage in the plurality of stages has the reduced interference.

In yet a further aspect of the disclosure, an apparatus for reducing interference of a signal over a plurality of stages is provided. The apparatus includes means for determining at least two equalizer taps based on at least one of a covariance and a channel impulse response of the signal, and means for estimating at least one additional equalizer tap based on the at least two equalizer taps. The apparatus further includes means for reducing, for each of the plurality of stages, the interference of the signal for that stage using an equalizer tap from either the at least two equalizer taps or the at least one additional equalizer tap, so that the signal for the next stage in the plurality of stages has the reduced interference.

In yet a further aspect of the disclosure, a processing system for reducing interference of a signal over a plurality of stages is provided. The processing system includes a module configured to determine at least two equalizer taps based on at least one of a covariance and a channel impulse response of the signal, and to estimate at least one additional equalizer tap based on the at least two equalizer taps. The module is further configured to reduce, for each of the plurality of stages, the interference of the signal for that stage using an equalizer tap from either the at least two equalizer taps or the at least one additional equalizer tap, so that the signal for the next stage in the plurality of stages has the reduced interference.

In yet a further aspect of the disclosure, a machine-readable medium encoded with instructions for reducing interference of a signal over a plurality of stages is provided. The instructions include code for determining at least two equalizer taps based on at least one of a covariance and a channel impulse response of the signal, and estimating at least one additional equalizer tap based on the at least two equalizer taps. In addition, the instructions include code for reducing, for each of the plurality of stages, the interference of the signal for that stage using an equalizer tap from either the at least two equalizer taps or the at least one additional equalizer tap, so that the signal for the next stage in the plurality of stages has the reduced interference.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
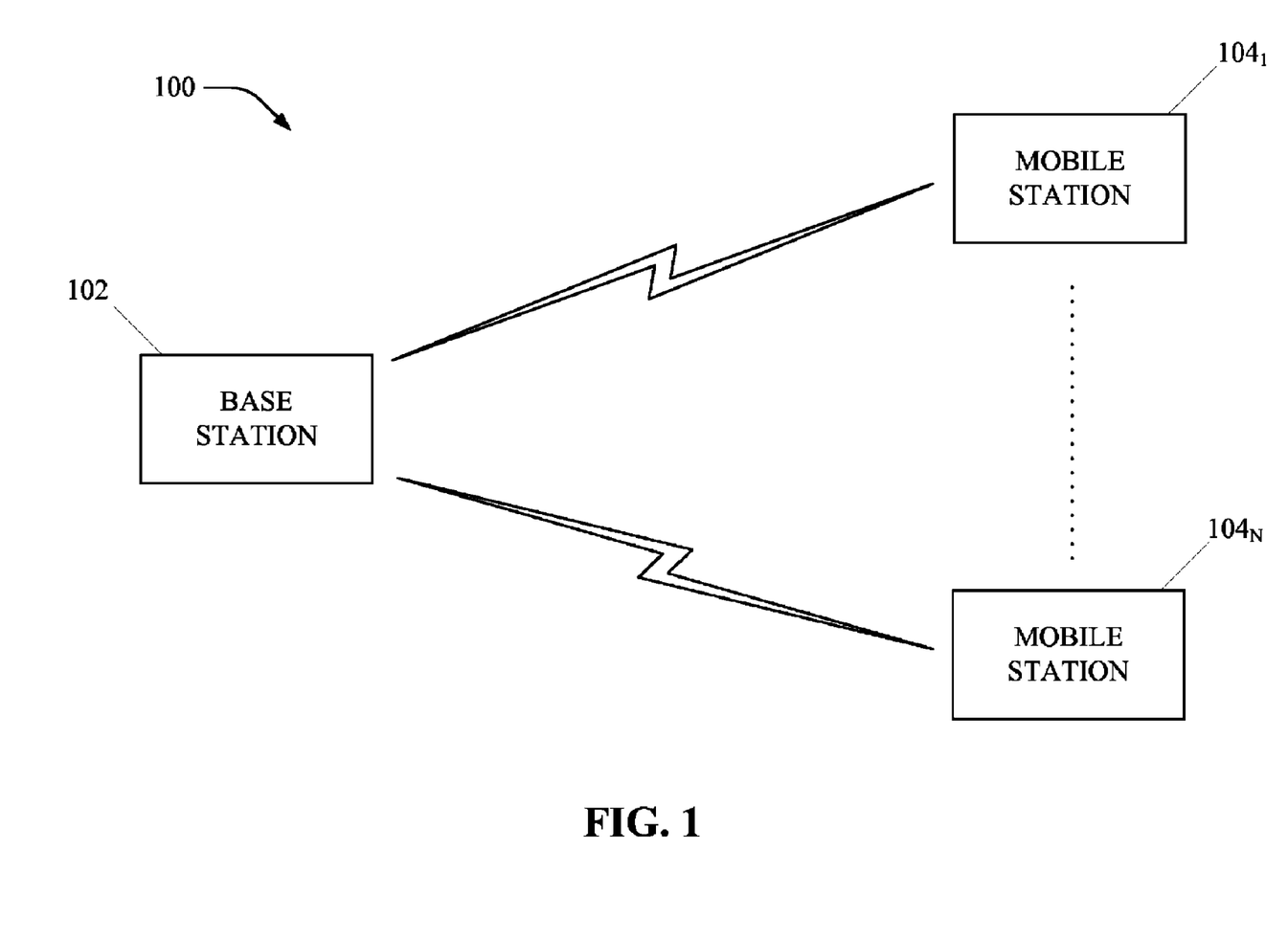
FIG. 1 is a diagram illustrating an example of a wireless communication system in which a receiver can be used.

FIG. 1 is a diagram illustrating an example of a wireless communication system in which a receiver can be used. A base station 102 can transmit data intended for a plurality of mobile stations $104_1$ to $104_N$. A wide variety of types of data can be communicated, including, but not limited to, system information, voice data, graphics, email messages, multimedia, information for files, and the like.

Any of mobile stations $104_1$ to $104_N$ can represent a mobile phone, a computer, a laptop computer, a telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting wireless communication. In addition, mobile stations $104_1$ to $104_N$ can be stationary or mobile, and can include digital devices, analog devices or a combination of both.

Communication system 100 can correspond with an Ultra-Wideband (UWB) system, which is a radio technology for Wireless Personal Area Networks (WPAN). Communication system 100 may use one of many other communications protocols. By way of example, communication system 100 may support Evolution-Data Optimized (EV-DO) and/or Ultra Mobile Broadband (UMB). EV-DO and UMB are air interface standards promulgated by the 3rd Generation Partnership Project 2 (3GPP2) as part of the CDMA2000 family of standards and employ multiple access techniques such as Code Division Multiple Access (CDMA) to provide broadband Internet access to mobile subscribers. Alternatively, communication system 100 may support Long Term Evolution (LTE), which is a project within the 3GPP2 to improve the Universal Mobile Telecommunications System (UMTS) mobile phone standard based primarily on a Wideband CDMA (W-CDMA) air interface. Communication system 100 may also support the WiMAX standard associated with the WiMAX forum. These are merely exemplary protocols, and communication system 100 is not limited to these examples.

The actual communications protocol(s) employed by communication system 100 will depend on the specific application and the overall design constraints imposed on the system. The various techniques presented throughout this disclosure can be applicable in a wireless or wired communications system or other types of systems or devices.

Figure 2:
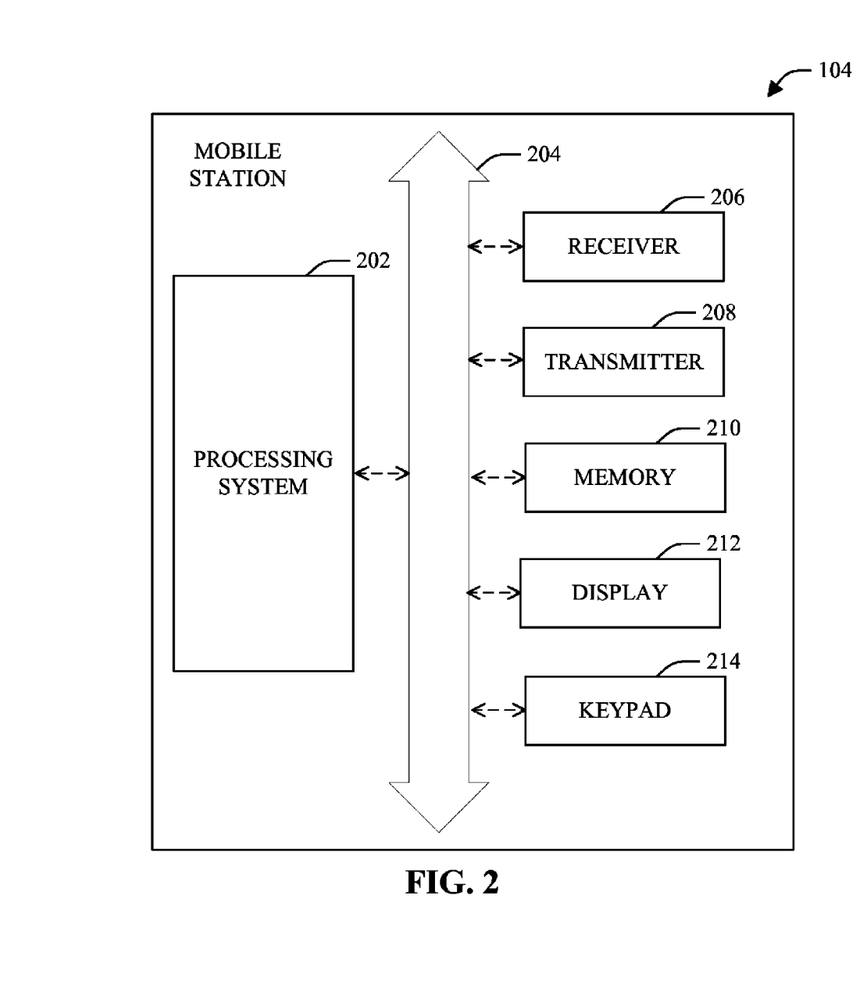
FIG. 2 is a conceptual block diagram illustrating an example of one of the mobile stations of FIG. 1.

FIG. 2 is a conceptual block diagram illustrating an example of one of the mobile stations of FIG. 1. Mobile station 104 includes a processing system 202 which is capable of communication with a receiver 206 and transmitter 208 through a bus 204 or other structures or devices. It should be understood that communication means other than busses can be utilized with the disclosed configurations. Processing system 202 can generate audio, video, multimedia, and/or other types of data to be provided to transmitter 208 for communication. In addition, audio, video, multimedia, and/or other types of data can be received at receiver 206, and processed by processing system 202.

Processing system 202 may include a general purpose processor and volatile or non-volatile memory for storing data and instructions for software programs. The software programs, which may be stored in memory 210, may be used by processing system 202 to control and manage access to the various networks, as well as provide other communication and processing functions. The software programs may also provide an interface to processing system 202 for various user interface devices, such as a display 212 and a keypad 214.

Figure 3:
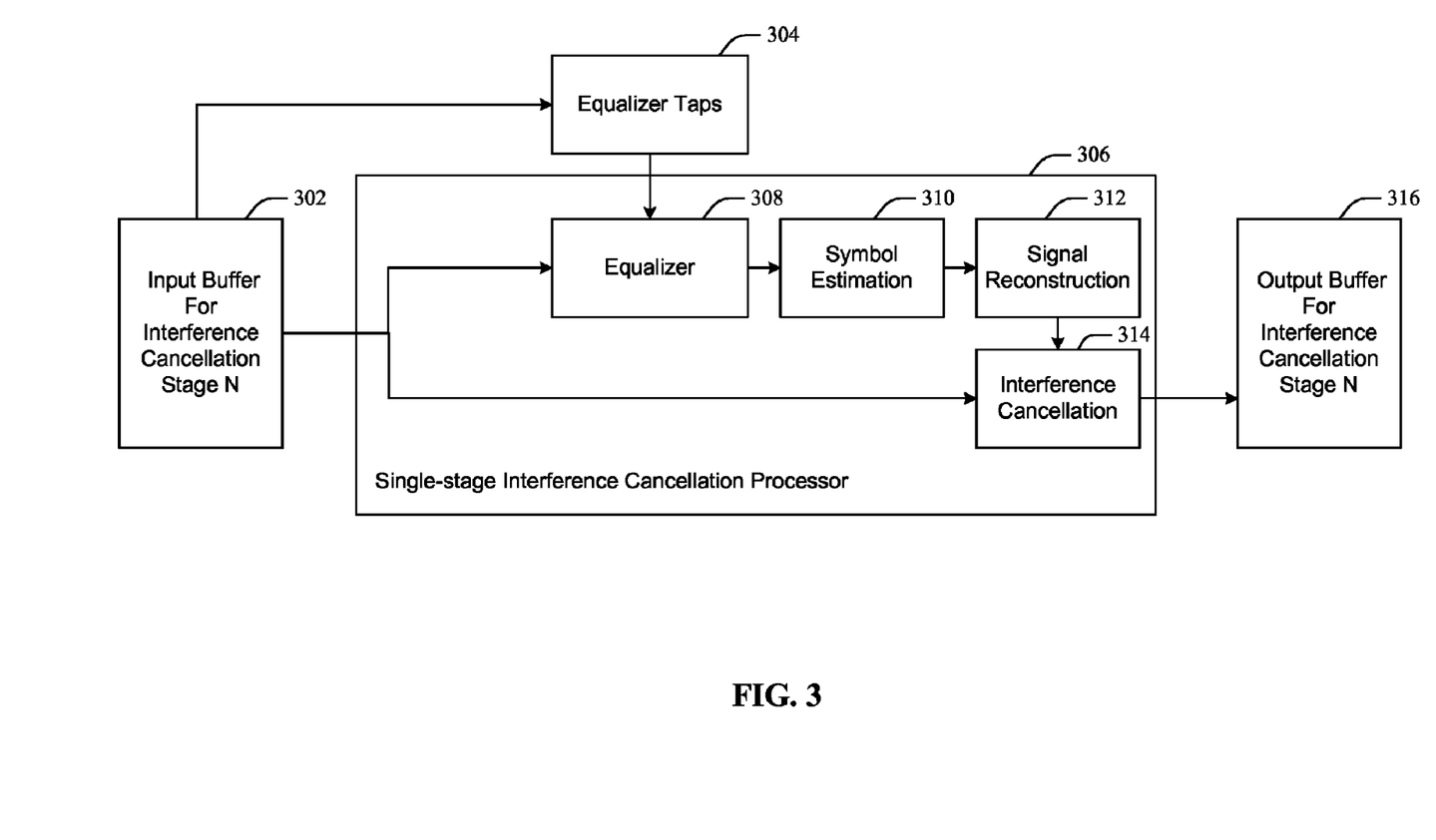
FIG. 3 is a conceptual block diagram illustrating an exemplary single-stage interference canceller for use within a multi-stage interference canceller.

FIG. 3 is a conceptual block diagram illustrating an exemplary single-stage interference canceller for use within a multi-stage interference canceller. In this regard, a multi-stage interference cancellation algorithm may use an equalizer in each of its multiple stages. FIG. 3 illustrates an example of how a single stage may use an equalizer to perform interference cancellation.

As can be seen in FIG. 3, an input buffer 302 (e.g., signal) for interference cancellation may be provided to a single-stage interference cancellation processor 306, which may include an equalizer 308, a symbol estimation module 310, a signal reconstruction module 312 and an interference cancellation module 314. Input buffer 302 may also be provided to an equalizer taps module 304, which may compute the equalizer taps to be used for cancelling interference for the signal at a particular stage.

For a given stage N, equalizer 308 may take both the input buffer 302 (e.g., signal) and the output from equalizer taps module 304 as input, and may output an equalized signal. The output of equalizer 308 may be provided to symbol estimation module 310, which may perform symbol estimation on the equalized signal. The output from symbol estimation module 310 may be provided to signal reconstruction module 312, which performs signal reconstruction on the signal. The reconstructed signal, together with the original input buffer 302, may be provided to interference cancellation module 314, which may cancel interference from the signal. More particularly, interference module 314 may subtract the original signal from the reconstructed and equalized signal to reduce interference for that stage, so that the signal for a next stage has the reduced interference. The signal in which interference is cancelled may correspond with the output buffer 316.

Figure 4:
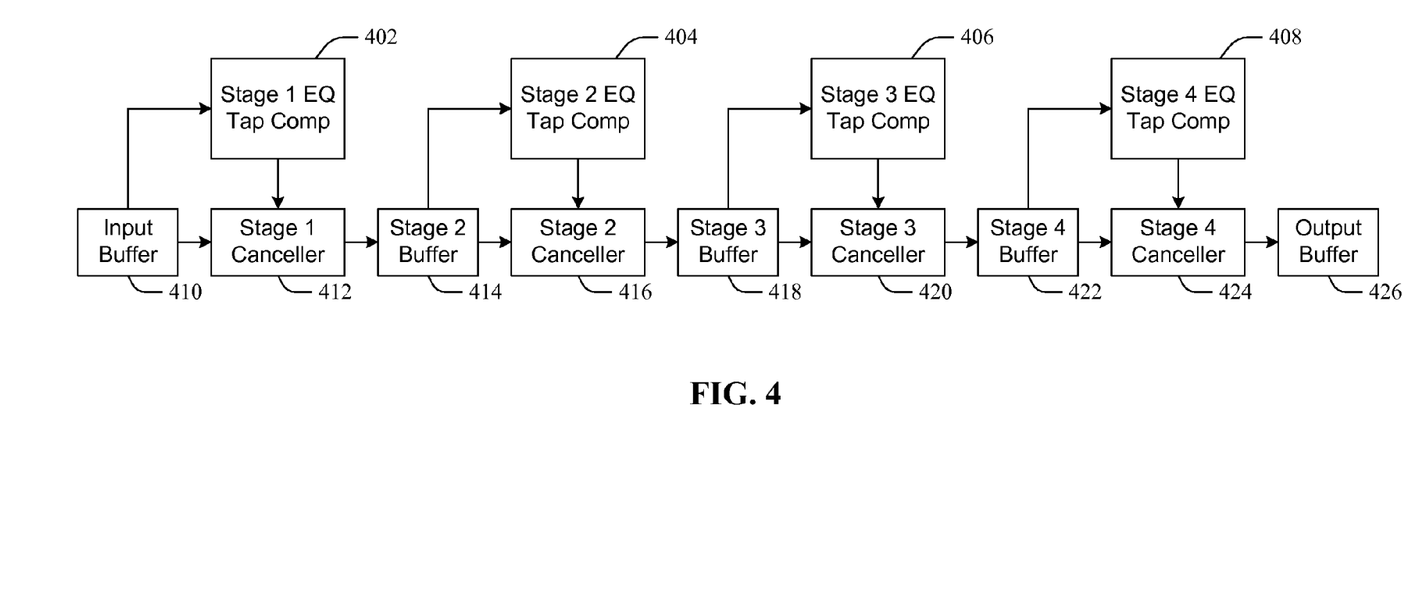
FIG. 4 is a conceptual block diagram illustrating an exemplary multi-stage interference canceller in which equalizer taps are computed at each stage.

FIG. 4 is a conceptual block diagram illustrating an exemplary multi-stage interference canceller in which equalizer taps are computed at each stage. Such a multi-stage interference canceller may be used, for example, within base station 102 or mobile station 104. As noted above, each of the single-stage interference cancellers of FIG. 4 may correspond with the single-stage canceller illustrated in FIG. 3.

As shown in FIG. 4, when multiple stages are used, the output of each stage is the input to the next stage. For example, at stage 1, input buffer 410 may be provided to stage 1 tap computation module 402 and to stage 1 canceller 412. Stage 1 equalizer tap computation module 402 may compute the equalizer taps for cancelling interference for input buffer 410 (e.g., the signal) for stage 1. The equalizer taps may correspond with LMMSE equalizer taps, and may be computed based on an autocorrelation of the input samples for stage 1. Stage 1 canceller 412 may cancel interference for the signal based on the computed equalizer taps. The output from stage 1 canceller 412 may correspond with the input buffer for stage 2 (e.g., stage 2 buffer 414).

Stages 2, 3 and 4 each have a buffer (414, 418, 422), a stage equalizer tap computation module (404, 406, 408) and a stage canceller (416, 420, 424), respectively. The output from stage 4 canceller 426 corresponds with output buffer 426, which may correspond with the signal in which interference has been cancelled from all four stages.

As such, the exemplary configuration of FIG. 4 is seen to correspond with a successive cancellation scheme, which is an extension of decision feedback equalization to multi-cell or multi-transmitter scenarios. In the successive cancellation scheme of FIG. 4, a residual signal's covariance or power spectrum density (the frequency-domain representation of the covariance) is re-estimated at every stage, in order to re-compute equalizers over the multiple stages.

It should be noted that although four stages are shown in FIG. 4, any number of stages may be used. In addition, although FIG. 4 shows individual buffers for each stage, it is also possible for each successive stage to overwrite its input with its output so that only a single buffer is used. Similarly, the processing block for each cancellation stage may be performed by a single processor used serially.

Figure 5:
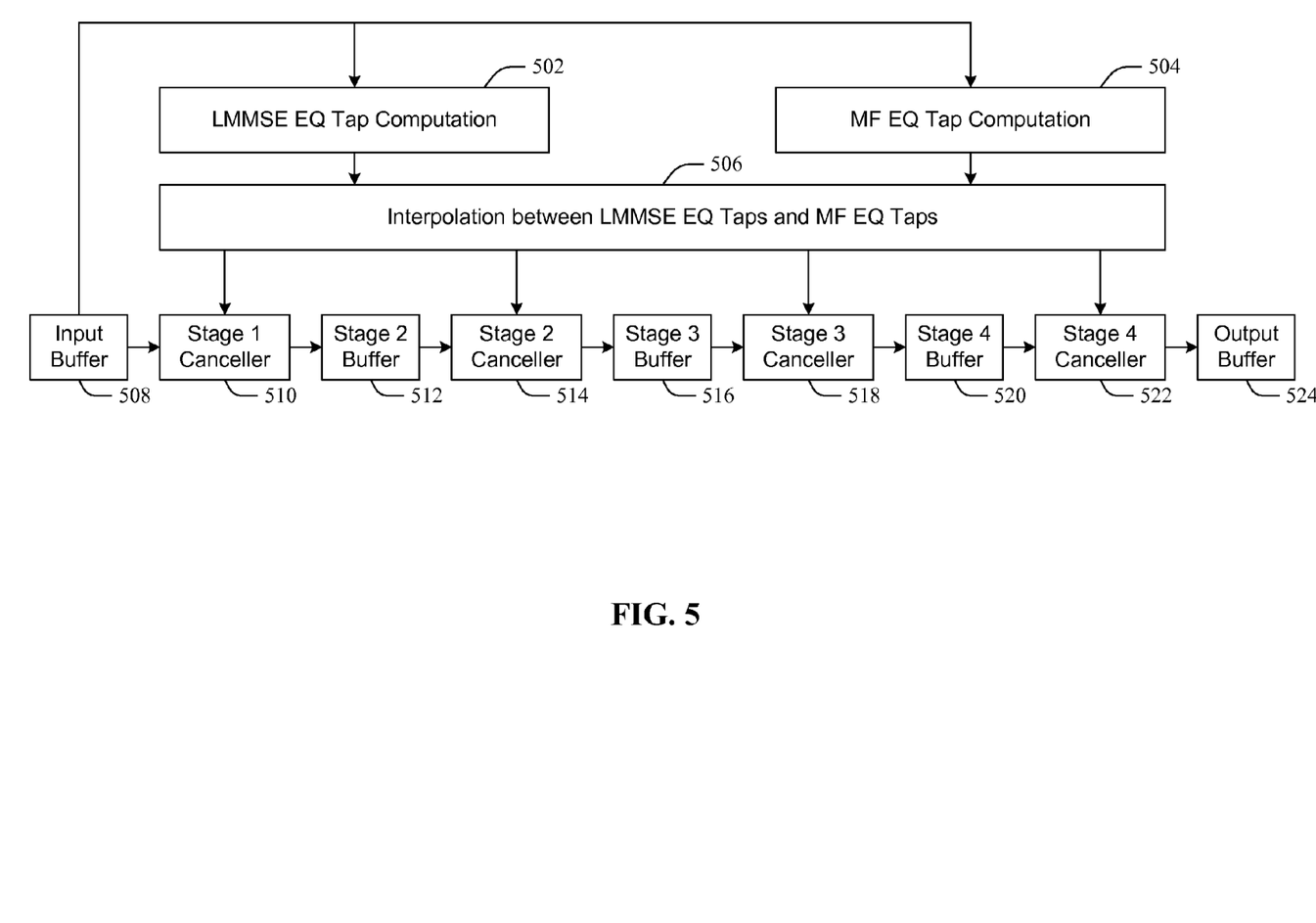
FIG. 5 is a conceptual block diagram illustrating an exemplary multi-stage interference canceller in which equalizer taps are interpolated from a linear minimum mean-squared error (LMMSE) and matched filter (MF).

FIG. 5 is a conceptual block diagram illustrating an exemplary multi-stage interference canceller in which equalizer taps are interpolated from linear minimum mean-squared error (LMMSE) and matched filter (MF) values. Such a multi-stage interference canceller may be used, for example, within base station 102 or mobile station 104. It should be noted that equalizer tap computation may be computationally expensive, so a reduced-complexity computation that provides equalizer taps with approximately the same performance as the per-stage LMMSE equalizer taps is desirable.

As can be seen in FIG. 5, two sets of equalizer taps may be computed based on the original and un-canceled signal (e.g., input buffer 508). The two sets of equalizer taps may be LMMSE equalizer taps and MF equalizer taps, which may be computed by LMMSE equalizer tap computation module 502 and MF equalizer tap computation module 504, respectively. The LMMSE equalizer taps may be based on a covariance and channel impulse response of the signal, and the MF equalizer taps may be based on the covariance of the signal. The equalizer taps for each stage (e.g., stages 1 to 4) of interference cancellation may be formulated as a linear combination, or interpolation, of the LMMSE equalizer taps and the MF equalizer taps. The interpolation may be computed by interpolation module 506.

Accordingly, stage cancellers 510, 514, 518 and 522 receive interpolated equalizer taps from interpolation module 506 as input. In addition, stage cancellers 510, 514, 518 and 522 receive buffers 508, 512, 516 and 520 as input signals, respectively. The output from stage 4 canceller 522 corresponds with output buffer 524, which may correspond with the signal in which interference has been removed after all four stages.

It should be noted that equalizer weights may be assigned to each of the LMMSE and the MF equalizer taps during interpolation. For example, interpolation may occur using an LMMSE equalizer tap weight of 0.5, and an MF equalizer tap weight of 0.5. However, any combination of weights can be used at any of the stages in FIG. 5.

As such, the exemplary configuration of FIG. 5 is seen to correspond with a successive cancellation scheme in which a residual signal's covariance (or power spectrum density) is not re-estimated at every stage, but rather interpolated based on LMMSE and MF equalizer taps determined from the original signal.

Although four stages are shown in FIG. 5, any number of stages may be used. In addition, although FIG. 5 shows individual buffers for each stage, it is possible for each successive stage to overwrite its input with its output so that only a single buffer is used. Similarly, the processing blocks for each cancellation stage may be performed by a single processor used serially.

Figure 6:
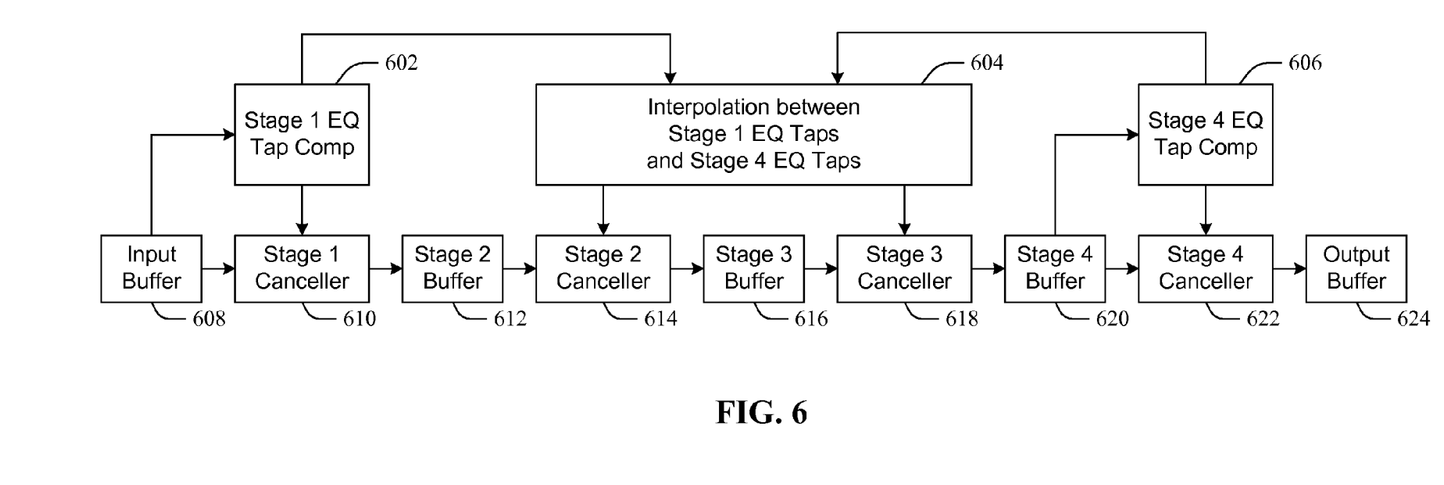
FIG. 6 is a conceptual block diagram illustrating an exemplary multi-stage interference canceller in which equalizer taps are estimated for intermediate stages.

FIG. 6 is a conceptual block diagram illustrating an exemplary multi-stage interference canceller in which equalizer taps are estimated for intermediate stages. Such a multi-stage interference canceller may be used, for example, within base station 102 or mobile station 104. As noted above, equalizer tap computation may be computationally expensive, so a reduced-complexity computation that provides equalizer taps with approximately the same performance as the per-stage LMMSE equalizer taps is desirable.

As can be seen in FIG. 6, the full equalizer tap computation may be performed on a subset of the stages, and interpolation may be used to compute equalizer taps on the remaining intermediate stages. In the example of FIG. 6, equalizer tap computation (e.g., LMMSE equalizer tap computation) may be performed on the first and fourth stages using stage equalizer tap computation modules 602 and 606, respectively. The computation of these equalizer taps may be based on a covariance of the signal. Interpolation may be used to determine the equalizer taps for the second and third stages using interpolation module 604.

Accordingly, stage cancellers 610 and 622 respectively receive equalizer taps from stage equalizer tap computation modules 602 and 606 as input. Stage cancellers 610 and 622 also receive buffers 608 and 620 as input signals, respectively. In addition, stage cancellers 614 and 618 receive interpolated equalizer taps from interpolation module 604 as input. Stage cancellers 614 and 618 also receive buffers 612 and 616 as input signals. The output from stage 4 canceller 622 corresponds with output buffer 624, which may correspond with the signal in which interference has been removed after all four stages.

Although FIG. 6 depicts the use of two measured and two interpolated stages, any number of measured and interpolated stages may be used. In addition, extrapolation may be used to determine equalizer taps for a stage, even if that stage is not between two stages with full LMMSE equalizer tap computation.

As such, the exemplary configuration of FIG. 6 is seen to correspond with a successive cancellation scheme in which a residual signal's covariance (or power spectrum density) is not re-estimated at every stage, but rather interpolated/extrapolated based on full equalizer tap computations of at least two stages.

It should also be noted that although four stages are shown in FIG. 6, any number of stages may be used. In addition, although FIG. 6 shows individual buffers for each stage, it is also possible for each successive stage to overwrite its input with its output so that only a single buffer is used. Similarly, the processing block for each cancellation stage may be performed by a single processor used serially.

Accordingly, equalizer approximation may be performed for a successive interference cancellation system via interpolation and/or extrapolation. By using interpolation and/or extrapolation, the computation associated with re-estimating a residual signal's covariance (or power spectrum density) and recomputing equalizers for different stages of a successive cancellation scheme may be reduced.

In this regard, retraining the equalizer for a successive cancellation scheme may typically require re-estimating the residual waveform's covariance (or power spectrum density), from which a new equalizer is recomputed. As noted above, a successive interference cancellation system typically requires retraining the equalizer after each time estimated signals, or refinements thereof, are subtracted from the received waveform. This calculation may be simplified by either interpolating a first-stage equalizer with a matched-filter, or by interpolating and/or extrapolating among equalizers computed at different stages of the cancellation scheme. The interpolation weights can also be made adaptive, depending on the signals being subtracted.

According to one aspect of the subject disclosure, in addition to the interpolation and/or extrapolation, the equalizer tap coefficient calculation may include thresholding. In this regard, it may possible for the LMMSE equalizer to utilize a certain time delay tap, while the MF equalizer does not use the time delay tap corresponding to the same time delay. Conversely, the MF equalizer may use a certain time delay tap, while the LMMSE equalizer does not use the time delay tap corresponding to the same time delay. In these cases, the interpolation and/or extrapolation may be performed with the assumption that the tap coefficient for the time delay tap in the equalizer that did not utilize that particular time delay is zero. The interpolation may then be between a zero and a non-zero tap coefficient value. In such cases, additional thresholding may be applied where tap coefficients below a certain threshold are set to zero. The threshold may be set, for example, as a function of the estimated SNR.

Figure 7:
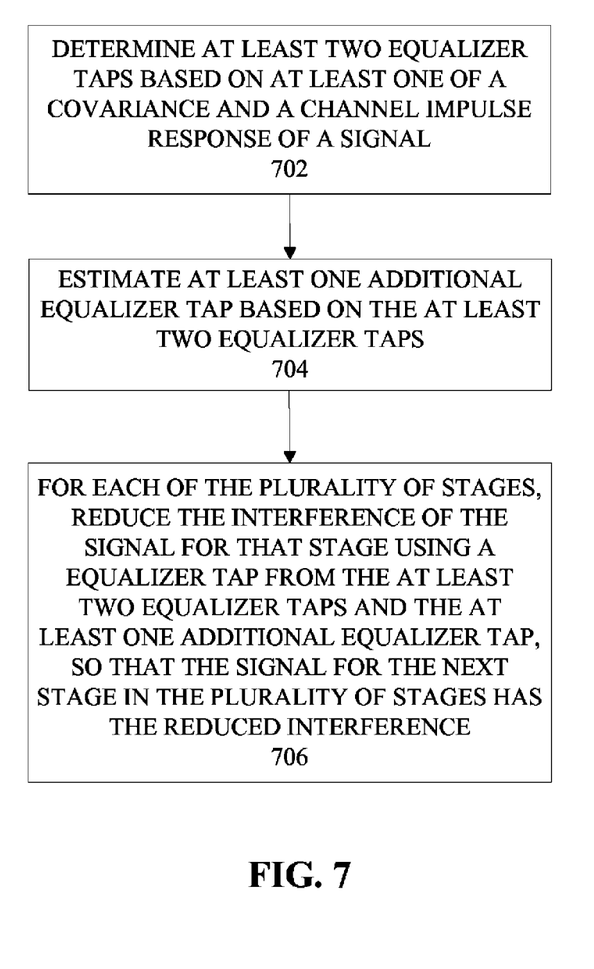
FIG. 7 is a flowchart illustrating an exemplary operation of reducing interference of a signal over a plurality of stages.

FIG. 7 is a flowchart illustrating an exemplary operation of reducing interference of a signal over a plurality of stages. In step 702, at least two equalizer taps are determined based on at least one of a covariance and a channel impulse response of the signal. In step 704, at least one additional equalizer tap is estimated based on the at least two equalizer taps. In step 706, for each of the plurality of stages, the interference of the signal for that stage is reduced using an equalizer tap from either the at least two equalizer taps or the at least one additional equalizer tap, so that the signal for the next stage in the plurality of stages has the reduced interference.

Figure 8:
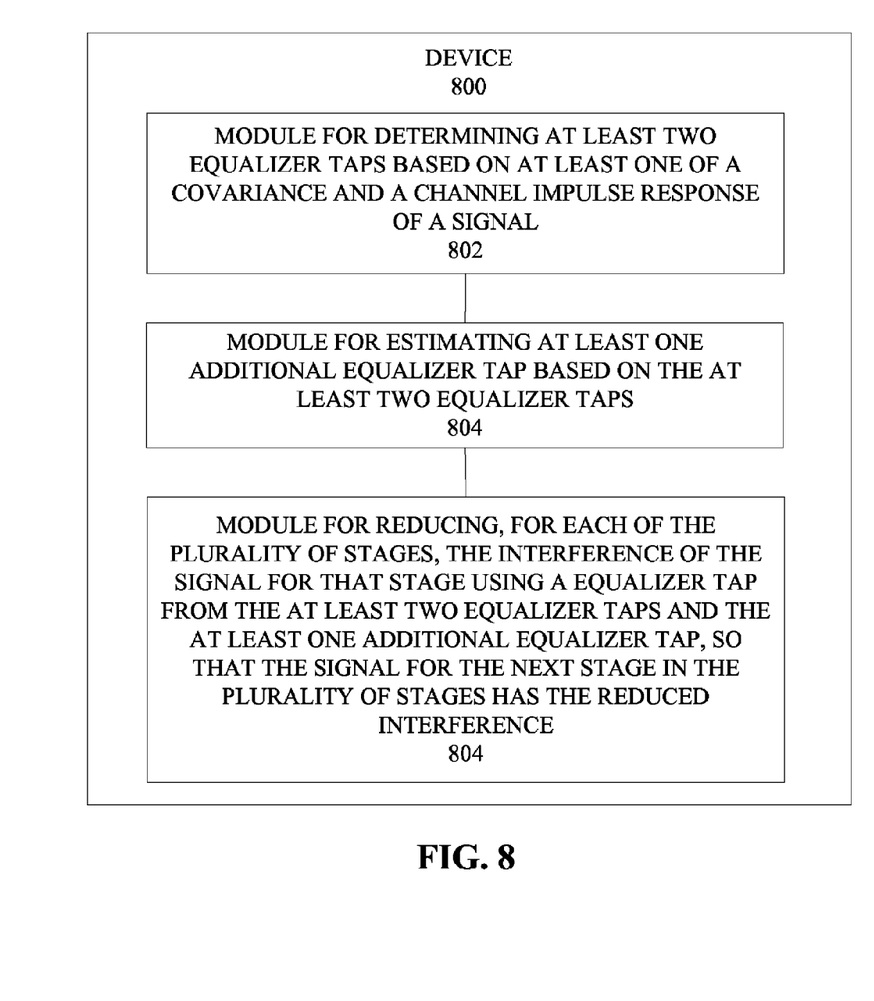
FIG. 8 is a conceptual block diagram illustrating an example of the functionality of a device for reducing interference of a signal over a plurality of stages.

FIG. 8 is a conceptual block diagram illustrating an example of the functionality of a device for reducing interference of a signal over a plurality of stages. Device 800 includes a module 802 for determining at least two equalizer taps based on at least one of a covariance and a channel impulse response of the signal. Device further includes a module 804 for estimating at least one additional equalizer tap based on the at least two equalizer taps. In addition, device 800 includes a module 806 for reducing, for each of the plurality of stages, the interference of the signal for that stage using an equalizer tap from either the at least two equalizer taps or the at least one additional equalizer tap, so that the signal for the next stage in the plurality of stages has the reduced interference.

Referring back to FIG. 2, processing system 202 may be implemented using software, hardware, or a combination of both. By way of example, processing system 202 may be implemented with a processor. A processor may be related to one or more processors, and a processor may be included in a module. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information. Processing system 202 may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for processing system 202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a mobile station or a processing system. Instructions can be, for example, a computer program including code. A machine-readable medium may comprise one or more media.

Those of skill in the art would appreciate that the various illustrative blocks, modules, elements, components, methods, and algorithms described herein may be implemented as electronic hardware, computer software, or combinations of both. Skilled artisans may implement the described functionality in varying ways for each particular application. Furthermore, various components and blocks may be arranged differently (e.g., arranged in a different order, or partitioned in a different way) all without departing from the scope of the subject technology.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description is provided to enable any person skilled in the art to practice the various configurations described herein. Various modifications to these configurations will be readily apparent to those skilled in the art, and the generic principles defined herein may be applied to other configurations. Thus, the claims are not intended to be limited to the configurations shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The terms used herein such as "for example," "for instance," "example," "instance," "by way of example," "such as," and the like indicate an illustration by way of example, and not by way of limitation. All structural and functional equivalents to the elements of the various configurations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for processing a signal over a plurality of stages, the apparatus comprising a processor configured to:
   determine at least two equalizer taps based on at least one of a covariance and a channel impulse response of the signal;
   estimate at least one additional equalizer tap based on the at least two equalizer taps; and
   at each of the plurality of stages, reduce at least a portion of an interference of the signal using the at least one additional equalizer tap,
   wherein the at least two equalizer taps comprise an LMMSE equalizer tap and a matched equalizer tap, wherein the LMMSE equalizer tap is based on the covariance and the channel impulse response and wherein the matched equalizer tap is based on the channel impulse response,
   wherein the processor is configured to estimate the at least one additional equalizer tap by interpolating between the LMMSE equalizer tap and the matched equalizer tap to determine an interpolated equalizer tap corresponding to each of the plurality of stages, and wherein the processor is configured to reduce the at least a portion of the interference of the signal at each of the plurality of stages using the corresponding interpolated equalizer tap.

2. The apparatus of claim 1, wherein the processor is configured to reduce the at least a portion of the interference by performing at each stage of the plurality of stages:
   equalizing an input signal of the particular stage using the one of the at least two equalizer taps or the at least one additional equalizer tap;
   estimating the input signal based on the equalized signal; and
   subtracting the estimated signal from the equalized signal.

3. The apparatus of claim 1, wherein the processor is configured to reduce the at least a portion of the interference by buffering an input signal of each of the plurality of stages, wherein the input signal of a first stage of the plurality of stages is the signal.

4. The apparatus of claim 3, further comprising a single buffer configured to buffer the input signal of each of the plurality of stages.

5. The apparatus of claim 1, wherein the processor is configured to estimate the at least one additional equalizer tap by:
   assigning weight values for each of the at least two equalizer taps; and
   estimating the at least one additional equalizer tap based on the assigned weight values.

6. A method for reducing interference of a signal over a plurality of stages, the method comprising:
   determining, at a processor, at least two equalizer taps based on at least one of a covariance and a channel impulse response of the signal;
   estimating at least one additional equalizer tap based on the at least two equalizer taps; and
   at each of the plurality of stages, reducing at least a portion of the interference of the signal using the at least one additional equalizer tap,
   wherein the at least two equalizer taps comprise an LMMSE equalizer tap and a matched equalizer tap, wherein the LMMSE equalizer tap is based on the covariance and the channel impulse response and wherein the matched equalizer tap is based on the channel impulse response,
   wherein estimating the at least one additional equalizer tap comprises interpolating between the LMMSE equalizer tap and the matched equalizer tap to determine an interpolated equalizer tap corresponding to each of the plurality of stages, and wherein reducing the at least a portion of the interference of the signal for each of the plurality of stages comprises using the corresponding interpolated equalizer tap.

7. The method of claim 6, wherein the reducing the at least a portion of the interference comprises performing at each stage of the plurality of stages:
   equalizing an input signal of the particular stage using one of the at least two equalizer taps or the at least one additional equalizer tap;
   estimating the input signal based on the equalized signal; and
   subtracting the estimated signal from the equalized signal.

8. The method of claim 6, wherein the reducing the at least a portion of the interference comprises buffering an input signal of each of the plurality of stages, wherein the input signal at a first stage of the plurality of stages is the signal.

9. The method of claim 6, wherein reducing the at least a portion of the interference of the signal comprises buffering an input signal of each of the plurality of stages using a single buffer, wherein the input signal of a first stage of the plurality of stages is the signal.

10. The method of claim 6, wherein estimating estimate the at least one additional equalizer comprises:
    assigning weight values for each of the at least two equalizer taps; and
    estimating the at least one additional equalizer tap based on the assigned weight values.

11. An apparatus, comprising:
    means for determining at least two equalizer taps based on at least one of a covariance and a channel impulse response of a signal;
    means for estimating at least one additional equalizer tap based on the at least two equalizer taps; and
    means for reducing, for each of a plurality of stages, at least a portion of an interference of the signal using the at least one additional equalizer tap, wherein the at least two equalizer taps comprise an LMMSE equalizer tap and a matched equalizer tap, wherein the LMMSE equalizer tap is based on the covariance and the channel impulse response and wherein the matched equalizer tap is based on the channel impulse response, wherein the means for estimating the at least one additional equalizer tap comprises means for interpolating between the LMMSE equalizer tap and the matched equalizer tap to determine an interpolated equalizer tap corresponding to each of the plurality of stages, and wherein the means for reducing the at least a portion of the interference of the signal for each of the plurality of stages comprises using the corresponding interpolated equalizer tap.

12. The apparatus of claim 11, further comprising means for buffering an input signal of each of the plurality of stages, wherein the input signal of a first stage of the plurality of stages is the signal.

13. The apparatus of claim 11, wherein the means for estimating the at least one additional equalizer tap comprises:
   means for assigning weight values for each of the at least two equalizer taps; and
   means for estimating the at least one additional equalizer tap based on the assigned weight values for each of the at least two equalizer taps.

14. A processing system, comprising a module configured to:
   determine at least two equalizer taps based on at least one of a covariance and a channel impulse response of the signal;
   estimate at least one additional equalizer tap based on the at least two equalizer taps; and
   at each of the plurality of stages, reduce at least a portion of an interference of the signal using the at least one additional equalizer tap,
   wherein the at least two equalizer taps comprise an LMMSE equalizer tap and a matched equalizer tap, wherein the LMMSE equalizer tap is based on the covariance and the channel impulse response and wherein the matched equalizer tap is based on the channel impulse response,
   wherein the module is configured to estimate the at least one additional equalizer tap by interpolating between the LMMSE equalizer tap and the matched equalizer tap to determine an interpolated equalizer tap corresponding to each of the plurality of stages, and wherein the processor is configured to reduce the at least a portion of the interference of the signal at each of the plurality of stages using the corresponding interpolated equalizer tap.

15. A computer program product, comprising:
   a non-transitory computer-readable medium comprising:
      code for causing a computer to determine at least two equalizer taps based on at least one of a covariance and a channel impulse response of a signal;
      code for causing the computer to estimate at least one additional equalizer tap based on the at least two equalizer taps; and
      code for causing the computer to, at each of the plurality of stages, reduce at least a portion of an interference of the signal using the at least one additional equalizer tap,
      wherein the at least two equalizer taps comprise an LMMSE equalizer tap and a matched equalizer tap, wherein the LMMSE equalizer tap is based on the covariance and the channel impulse response and wherein the matched equalizer tap is based on the channel impulse response,
      wherein the code for causing the computer to estimate the at least one additional equalizer tap comprises code for causing the computer to interpolate between the LMMSE equalizer tap and the matched equalizer tap to determine an interpolated equalizer tap corresponding to each of the plurality of stages, and wherein the code for causing the computer to reduce the at least a portion of the interference of the signal for each of the plurality of stages uses the corresponding interpolated equalizer tap.

16. An apparatus for processing a signal over a plurality of stages, the apparatus comprising a processor configured to:
   determine at least two equalizer taps;
   estimate at least one additional equalizer tap based on the at least two equalizer taps; and
   at each stage of the plurality of stages, use one of the at least two equalizer taps or the at least one additional equalizer tap at a single-stage interference cancellation processor,
   wherein the at least two equalizer taps are based on a covariance of the signal and respectively correspond with at least two of the plurality of stages,
   wherein the processor is configured to estimate the at least one additional equalizer tap by extrapolating based on the at least two equalizer taps to produce an equalizer tap corresponding to each of the plurality of stages, and wherein the processor is configured to reduce at least a portion of interference of the signal at each stage of the plurality of stages using the equalizer tap that corresponds with the particular stage.

17. The apparatus of claim 16, wherein the processor is configured to reduce the at least a portion of interference by performing at each stage of the plurality of stages:
   equalizing an input signal of the particular stage using the one of the at least two equalizer taps or the at least one additional equalizer tap;
   estimating the input signal based on the equalized signal; and
   subtracting the estimated input signal from the equalized signal.

18. The apparatus of claim 16, wherein the processor is configured to reduce the at least a portion of interference by buffering an input signal of each of the plurality of stages, wherein the input signal of a first stage of the plurality of stages is the signal, and wherein the input signal of a second stage of the plurality of stages is an output signal of the first stage.

19. The apparatus of claim 16, further comprising a single buffer configured to buffer an input signal of each of the plurality of stages, wherein the input signal of a first stage of the plurality of stages is the signal.

20. The apparatus of claim 16, wherein the processor is configured to estimate the at least one additional equalizer tap by:
   assigning weight values for each of the at least two equalizer taps; and
   estimating the at least one additional equalizer tap based on the assigned weight values.

21. A method for reducing interference of a signal over a plurality of stages, the method comprising:
   determining at least two equalizer taps;
   estimating at least one additional equalizer tap based on the at least two equalizer taps; and
   at each of the plurality of stages, using one of the at least two equalizer taps or the at least one additional equalizer tap at a single-stage interference cancellation processor, wherein the at least two equalizer taps are based on a covariance of the signal and respectively correspond with at least two of the plurality of stages, wherein estimating the at least one additional equalizer tap comprises extrapolating based on the at least two equalizer taps to produce an equalizer tap corresponding to each of the plurality of stages, and wherein each single-stage interference cancellation processor reduces at least a portion of the interference of the signal at each of the plurality of stages uses the equalizer tap that corresponds with the particular stage.

22. The method of claim 21, wherein the reducing the at least a portion of the interference comprises buffering an input signal of each of the plurality of stages, wherein the input signal of a first stage of the plurality of stages is the signal, and wherein the input signal of a second stage of the plurality of stages is an output signal of the first stage.

23. The method of claim 21, wherein reducing the at least a portion of the interference comprises performing at each stage of the plurality of stages:

equalizing an input signal of the particular stage using the one of the at least two equalizer taps or the at least one additional equalizer tap;

estimating the input signal based on the equalized signal; and subtracting the input estimated signal from the equalized signal.

24. An apparatus, comprising:

means for determining at least two equalizer taps;

means for estimating at least one additional equalizer tap based on the at least two equalizer taps; and means for using, at a single-stage interference cancellation processor of each of the plurality of stages, one of the at least two equalizer taps or the at least one additional equalizer tap, wherein the at least two equalizer taps are based on a covariance of a signal and respectively correspond with at least two of the plurality of stages, wherein the means for estimating the at least one additional equalizer tap comprises means for extrapolating based on the at least two equalizer taps to produce an equalizer tap corresponding to each of the plurality of stages, and wherein each single-stage interference cancellation processor reduces at least a portion of interference of the signal at each of the plurality of stages using the equalizer tap that corresponds with that stage.

25. The apparatus of claim 24, further comprising means for buffering an input signal of each of the plurality of stages.

26. The apparatus of claim 24, wherein the means for estimating the at least one additional equalizer tap comprises:

means for assigning weight values for each of the at least two equalizer taps; and means for estimating the at least one additional equalizer tap based on the assigned weight values.

27. A computer program product, comprising:

A non-transitory computer-readable medium comprising:

code for causing a computer to determine at least two equalizer taps;

code for causing the computer to estimate at least one additional equalizer tap based on the at least two equalizer taps; and code for causing the computer to, at each of the plurality of stages, use one of the at least two equalizer taps or the at least one additional equalizer tap at a single-stage interference cancellation processor, wherein the at least two equalizer taps are based on the covariance of the signal and respectively correspond with at least two of the plurality of stages, wherein the code for causing the computer to estimate the at least one additional equalizer tap comprises code for causing the computer to extrapolate to provide the at least one additional equalizer tap based on the at least two equalizer taps to produce an equalizer tap corresponding to each of the plurality of stages, and wherein each single-stage interference cancellation processor reduces at least a portion of interference of the signal at each of the plurality of stages uses the equalizer tap that corresponds with the particular stage.

* * * * *